(12) United States Patent
Kleiner et al.

(10) Patent No.: US 9,056,926 B2
(45) Date of Patent: Jun. 16, 2015

(54) PROCESS FOR PREPARING AQUEOUS POLYACRYLIC ACID SOLUTIONS

(75) Inventors: Matthias Kleiner, Mannheim (DE);
Wolfgang Loth, Bad Durkheim (DE);
Markus Brym, Mannheim (DE); Elke Gütlich-Hauk, Lambsheim (DE);
Bolette Urtel, Bobenheim-Roxheim (DE); Ruth Wirschem, Mannheim (DE);
Jürgen Detering, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 348 days.

(21) Appl. No.: 13/505,907

(22) PCT Filed: Nov. 2, 2010

(86) PCT No.: PCT/EP2010/066583
§ 371 (c)(1),
(2), (4) Date: May 3, 2012

(87) PCT Pub. No.: WO2011/054789
PCT Pub. Date: May 12, 2011

(65) Prior Publication Data
US 2012/0214941 A1    Aug. 23, 2012

(30) Foreign Application Priority Data
Nov. 4, 2009   (EP) ..................... 09175014

(51) Int. Cl.
| C08L 33/02 | (2006.01) |
| C08F 6/06 | (2006.01) |
| B01J 19/00 | (2006.01) |
| C08F 6/00 | (2006.01) |
| C08F 6/10 | (2006.01) |
| C08F 20/06 | (2006.01) |

(52) U.S. Cl.
CPC ............... *C08F 6/06* (2013.01); *B01J 19/0093* (2013.01); *B01J 2219/00006* (2013.01); *B01J 2219/00033* (2013.01); *B01J 2219/00783* (2013.01); *B01J 2219/00858* (2013.01); *B01J 2219/00873* (2013.01); *B01J 2219/00889* (2013.01); *C08F 6/003* (2013.01); *C08F 6/10* (2013.01); *C08F 20/06* (2013.01)

(58) Field of Classification Search
CPC .................. C08F 2/01; C08F 2/10; C08F 2/38
USPC ................ 526/62, 64, 65, 66, 73, 88, 317.1
See application file for complete search history.

(56) References Cited

U.S. PATENT DOCUMENTS

| 4,509,987 | A | | 4/1985 | Farrar et al. |
| 4,729,877 | A | * | 3/1988 | Hennig et al. ............... 422/134 |
| 4,839,417 | A | | 6/1989 | Suetterlin et al. |
| 5,055,197 | A | | 10/1991 | Albright et al. |
| 5,317,053 | A | | 5/1994 | Brown et al. |
| 6,096,858 | A | | 8/2000 | Dobbelaar et al. |
| 6,395,813 | B1 | | 5/2002 | Duccini et al. |
| 6,555,629 | B1 | * | 4/2003 | Pysall et al. ..................... 526/64 |
| 7,405,264 | B2 | * | 7/2008 | Yuasa et al. ................... 526/333 |
| 2004/0097674 | A1 | | 5/2004 | Suau et al. |
| 2005/0020790 | A1 | | 1/2005 | Michl et al. |
| 2006/0287423 | A1 | | 12/2006 | Michl et al. |
| 2008/0106968 | A1 | * | 5/2008 | Schanz et al. ................. 366/134 |
| 2010/0105832 | A1 | | 4/2010 | Csihony et al. |
| 2011/0028666 | A1 | | 2/2011 | Mattmann et al. |
| 2011/0054071 | A1 | * | 3/2011 | Mattmann et al. ............. 523/351 |

FOREIGN PATENT DOCUMENTS

| CA | 1332856 C | 11/1994 |
| DE | 1 248 943 B | 8/1967 |
| DE | 1248943 B * | 8/1967 |
| DE | 36 20 149 A1 | 12/1987 |
| DE | 19621027 A1 | 11/1997 |
| DE | 197 16 373 A1 | 10/1998 |
| DE | 103 11 617 A1 | 9/2004 |
| DE | 102009019470 A1 | 11/2009 |
| EP | 097 495 A1 | 1/1984 |
| EP | 97495 A * | 1/1984 |
| EP | 313 483 A1 | 4/1989 |
| EP | 967 232 A1 | 12/1999 |
| EP | 1 024 150 A1 | 8/2000 |
| EP | 1500666 A2 | 1/2005 |
| EP | 2182 011 A1 | 5/2010 |
| GB | 2122628 A | 1/1984 |
| WO | WO-2005/018786 A1 | 3/2005 |
| WO | WO-2009133186 A1 | 11/2009 |

OTHER PUBLICATIONS

Machine translation of DE 1249843 B; 1968; Badische.*
Translation of International Preliminary Report on Patentability for PCT/EP2010/066583 mailed May 8, 2012.
Loiseau, J. et al., "Synthesis and Characterization of Poly(Acrylic Acid) Produced by RAFT Polymerization. Application as a Very Efficient Dispersant of CaCO3, Kaolin, and TiO2", Macromolecules, vol. 36, (2003), pp. 3066-3077.
International Search Report for PCT/EP2010/066583 mailed Feb. 9, 2011.
International Preliminary Report on Patentability for PCT/EP2010/066583 mailed Feb. 9, 2011.

* cited by examiner

*Primary Examiner* — Doris Lee
(74) *Attorney, Agent, or Firm* — Drinker Biddle & Reath LLP (57) ABSTRACT

A process for preparing aqueous solutions of homo- or copolymers of acrylic acid by means of free-radical polymerization of acrylic acid and optionally water-soluble, monoethylenically unsaturated comonomers in an aqueous medium in the presence of at least one water-soluble initiator and of at least one water-soluble regulator, wherein the polymerization is conducted by means of a continuous process, and wherein, after the polymerization, low molecular weight components are at least partly removed from the resulting aqueous polymer solution. For the polymerization, preference is given to using microstructured mixers and reactors. Preference is given to using at least one reactor and/or mixer with microstructures for the process.

15 Claims, 3 Drawing Sheets

PROCESS FOR PREPARING AQUEOUS POLYACRYLIC ACID SOLUTIONS

CROSS-REFERENCE TO RELATED APPLICATIONS

This application is a national stage application (under 35 U.S.C. §371) of PCT/EP2010/066583, filed Nov. 2, 2010, which claims benefit of European application 09175014.1, filed Nov. 4, 2009.

The present invention relates to a process for preparing aqueous solutions of homo- or copolymers of acrylic acid by means of free-radical polymerization of acrylic acid and optionally water-soluble, monoethylenically unsaturated comonomers in an aqueous medium in the presence of at least one water-soluble initiator and of at least one water-soluble regulator, wherein the polymerization is conducted by means of a continuous process, and wherein, after the polymerization, low molecular weight components are at least partly removed from the resulting aqueous polymer solution. In a preferred embodiment of the invention, at least one reactor and/or mixer with microstructures is/are used for the process.

It is known that polyacrylic acid or polyacrylic acid copolymers with a relatively low molar mass $M_n$ can be used as a dispersing aid and/or grinding aid, especially for calcium carbonate particles. Aqueous calcium carbonate suspensions are typically prepared by wet grinding of calcium carbonate using polycarboxylates as grinding aids. Such calcium carbonate suspensions are used as fillers and white pigments in papermaking and in the paints industry. For good performance properties, a high fineness of the ground pigment is necessary, which should be achieved within a very short grinding time. In addition, the pigment suspensions must have good storage stability since residence times of several days often occur between the grinding process and further processing, and the suspensions must remain pumpable over this period.

EP 313 483 A1 discloses the use of poly(meth)acrylic acid homo- or copolymers with a mean molecular weight of 200 to 1900 g/mol as grinding aids for lime.

DE 36 20 149 A1 discloses the preparation of poly(meth)acrylic acid homo- or copolymers using water-soluble mercaptans, and the use thereof as dispersing aids. The examples disclose polyacrylic acids with a number-average molecular weight $M_n$ of 770 g/mol to 18 000 g/mol.

U.S. Pat. No. 6,395,813 B1 discloses phosphonate-terminated polyacrylic acids with a weight-average molecular weight $M_w$ of 2000 g/mol to 5800 g/mol.

DE 103 11 617 A1 discloses the use of polyacrylic acids with a weight-average molecular weight $M_w$ of 5000 g/mol to 30 000 g/mol as assistants for the wet grinding of calcium carbonate, the polyacrylic acids having sulfur-containing organic end groups having at least two carbon atoms.

U.S. Pat. No. 4,509,987 and U.S. Pat. No. 5,317,053 disclose dispersions of calcium carbonate particles with a particle size of less than 2 µm in water. The dispersing aid used is a copolymer of AMPS and at least 25% by weight of acrylic acid with a molecular weight of 1000 to 20 000 g/mol.

It is also known that polyacrylic acid for use as a dispersing aid can be prepared by means of processes for controlled free-radical polymerization, as described, for example, by J. Loiseau et al., Macromolecules 2003, 36, 3066-3077. Such polyacrylic acids have better dispersion performance than polyacrylic acid prepared by conventional methods.

U.S. 2004/0097674, and the prior application EP 2182 011 A1 to this applicant, describe polyacrylic acid homo- or copolymers which can be prepared by means of RAFT (reversible addition fragmentation transfer) polymerization. One disadvantage of RAFT polymerization for preparing aqueous polyacrylic acid solutions with comparatively low molecular weights is the comparatively high cost of the RAFT assistants used for polymerization, since RAFT assistants are not catalysts, but are instead incorporated stoichiometrically into the polymer molecules. A comparatively low molecular weight therefore means inevitably that the RAFT assistant has to be used in comparatively high amounts, under some circumstances several percent by weight based on the acrylic acid. Furthermore, the sulfur-containing RAFT assistants impart an unacceptable bad odor to the polyacrylic acid solution. The RAFT groups therefore have to be deactivated in a further process step before use. This can be accomplished, for example, by inconvenient and costly reaction with amines or by oxidation with hydrogen peroxide or ozone.

There is therefore still a need for an inexpensive preparation process for polyacrylic acid of low molecular weight, which has good properties as a dispersing aid.

Aqueous polymer solutions or dispersions may, after they have been prepared by free-radical polymerization, as well as the desired polymer, comprise an undesired proportion of organic components which are noticeable by intense odor or are undesired from a material point of view, for example because they are toxic or harmful to health, or else because they are disruptive in the intended application. Such components may be regulators used, for example mercaptans. Such components are therefore typically removed before the use of the polymer solutions or dispersions.

It is known that polymer solutions or dispersions can be subjected to an aftertreatment for deodorization to remove such volatile low molecular weight constituents which may cause an unacceptable odor. This may involve chemical deodorization, in which disruptive constituents are converted chemically, for example treated with oxidizing agents. However, this may also be a physical deodorization, in which the volatile constituents are removed by means of physical methods. Physical methods known to the person skilled in the art comprise steam stripping, as described, for example, by DE 1 248 943, DE 196 21 027 A1, DE 197 16 373 A1 or EP 967 232 A1, or ultrafiltration, as disclosed, for example, by U.S. Pat. No. 5,055,197 or EP 1 024 150 A1.

EP 097 495 A1 discloses a continuous process for preparing water-soluble polymers comprising at least 70% acrylic acid using a reactor having a closed circuit. The circuit includes a mixer in which monomer, initiator and regulator are mixed with the circulating mixture comprising water-soluble polymer. The mixture flows through a heat exchanger and polymerizes. After the polymerization, a portion of the polymer solution formed is withdrawn from the circuit, and polymer solution remaining in the circuit continues to flow within the circuit to the mixer already mentioned, in which monomer, initiator and regulator are again supplied to the circulating monomer solution.

The prior application WO 2009/133 186 A1 to this applicant discloses a process for continuously preparing polymers by free-radical polymerization, in which a reactor in which the reaction zone and the mixing zone have microstructures is used. For the polymerization, at least one free-radically polymerizable monomer, an initiator and a regulator are used. The reaction output can be subjected to an aftertreatment, for example postpolymerization, deodorization or neutralization. The examples disclose the use of the process to prepare polyacrylic acid with a number-average molecular weight $M_n$ of 2900 g/mol to 4900 g/mol and a polydispersity $M_w/M_n$ of 1.9 to 2.3, and the use thereof for preparing calcium carbonate dispersions.

It was an object of the present invention to provide an improved and inexpensive process for preparing aqueous polyacrylic acid solutions for use as an assistant for dispersions of calcium carbonate particles.

Accordingly, the invention relates to a process for preparing aqueous solutions of homo- or copolymers of acrylic acid by means of free-radical polymerization of acrylic acid and optionally water-soluble, monoethylenically unsaturated comonomers in an aqueous medium in the presence of at least one water-soluble initiator and of at least one water-soluble regulator, where the amount of acrylic acid is at least 50% by weight based on the sum of all monomers together and the number-average molar mass $M_n$ of the homo- or copolymer is 1000 g/mol to 20 000 g/mol, which comprises conducting the polymerization by means of a continuous process which comprises at least the following steps:

(Ia) continuously metering the reactants and water into a mixing unit comprising at least one mixer and mixing the reactants in the mixing unit at a temperature $T_M$, and (Ia) conducting continuous free-radical polymerization by passing the resulting aqueous reaction mixture through at least one reaction zone whose temperature is controlled by a temperature control medium of temperature $T_{target}$ in the range from 10° C. to 200° C., the reaction mixture being heated in a first—viewed in flow direction—region of the reaction zone, and, after passage through the heating zone, the temperature difference $\Delta T$ between the temperature $T_{target}$ and the actual temperature $T_R$ at any point in the reaction zone downstream of said heating zone, $|T_R - T_{target}|$, being ≤50 K, with the proviso that $T_{target}$ is greater than the mixing temperature $T_M$, and wherein, after the polymerization, in a further process step (II), low molecular weight components with a molar mass $M_n \leq 1000$ g/mol are at least partly removed from the resulting aqueous polymer solution.

The polymerization is preferably performed using microstructured mixers and reactors. $T_{target}$ is preferably at least 10 K greater than $T_M$.

The low molecular weight components to be removed are especially the residues of the regulator, residues of the monomers and oligomers formed from acrylic acid, and any further monomers. In a preferred embodiment of the invention, low molecular weight components are removed from the aqueous polymer solution by means of stripping with steam or ultrafiltration.

It has been found that, surprisingly, the combination of a continuous preparation of the polyacrylic acid with the removal of low molecular weight components not only significantly reduces the odor of the aqueous polymer solution but additionally results in polyacrylic acid homo- or copolymers which have significantly better properties in the case of use for preparing inorganic pigment suspensions, preferably calcium carbonate suspensions. Polyacrylic acid homo- or copolymers prepared in accordance with the invention can be used to obtain pigment suspensions, especially calcium carbonate suspensions, which have a significantly lower viscosity than in the case of use of polyacrylic acids in which volatile components are decomposed using oxidizing agents but the oxidized products remain in the polymer solution.

The process according to the invention comprises at least two process steps. In a first process step (I), the acrylic acid and any further water-soluble comonomers are free-radically polymerized by means of a continuous process, process step (I) comprising at least two component steps (Ia) and (Ib), specifically the mixing of the starting materials and the polymerization itself. In a further—continuous or batchwise—process step (II), low molecular weight components are at least partly removed from the resulting solution of the acrylic acid homo- or copolymers. The process may of course optionally also comprise further process steps or component steps.

Starting Materials Used:

The polymerization of the acrylic acid and optionally of further copolymers is performed in an aqueous medium.

The terms "aqueous solution" and "aqueous medium" in the context of this invention are intended to mean that the solvents used are essentially water. This does not rule out the presence of small amounts of other, water-miscible solvents. Further solvents may, for example, be alcohols such as methanol, ethanol or propanol. The amount of water should, however, generally be at least 80% by weight, preferably at least 90% by weight and more preferably at least 95% by weight, based on the sum of all solvents together. Particular preference is given to using exclusively water as the solvent. However, this procedure does not rule out that small amounts of alcohols may nevertheless be present in the aqueous medium after the polymerization owing to side reactions.

According to the invention, in addition to acrylic acid, further water-soluble, monoethylenically unsaturated comonomers may optionally be used for synthesis of the polymers, the amount of acrylic acid being at least 50% by weight based on the sum of all monomers together, preferably at least 80% by weight, more preferably 95% by weight, and most preferably exclusively acrylic acid is used as the monomer.

The use of comonomers allows the properties of the acrylic acid polymers to be modified. Examples of suitable monoethylenically unsaturated comonomers comprise other monomers with acidic groups, for example methacrylic acid, crotonic acid, maleic acid or maleic anhydride, itaconic acid, vinylphosphonic acid, vinylsulfonic acid, 2-acrylamido-2-methylpropanesulfonic acid (AMPS), water-soluble (meth) acrylic acid derivatives, for example hydroxyethyl acrylate, hydroxypropyl acrylate, hydroxybutyl acrylate, (meth)acrylamide, vinylformamide, alkali metal (3-methacryloyloxy) propanesulfonate, dimethylaminoethyl acrylate, 2-acryloyloxyethyltrimethylammonium chloride, dimethylamino methacrylate or polyethylene glycol methyl ether(meth)acrylate.

Acrylic acid and any acidic comonomers can be used in the form of free acids or else in completely or partly neutralized form.

According to the invention, the free-radical polymerization is conducted in the presence of at least one water-soluble regulator. Suitable regulators for the free-radical polymerization are known to those skilled in the art, and are selected suitably according to the desired properties of the polyacrylic acid homo- or copolymers. The term "water-soluble" in this context means that the regulator should be soluble in water at least at the desired use concentration. It will be appreciated that it is also possible to use mixtures of two or more regulators.

Regulators are preferably used in an amount of 0.05 to 25% by weight and more preferably of 0.1 to 10% by weight, based on the total weight of the monomers used for polymerization.

Water-soluble regulators are preferably sulfur-containing or phosphorus-containing, water-soluble regulators, especially mercaptans or hypophosphites, particularly sulfur-containing, water-soluble regulators.

Compounds of this kind are, for example, inorganic hydrogensulfites, disulfites and dithionites, or organic sulfides, disulfides, polysulfides, sulfoxides and sulfones. These include di-n-butyl sulfide, di-n-octyl sulfide, diphenyl sulfide, thiodiglycol, ethylthioethanol, diisopropyl disulfide, di-n-butyl disulfide, di-n-hexyl disulfide, diacetyl disulfide, diethanol sulfide, di-t-butyl trisulfide, dimethyl sulfoxide, dialkyl sulfide, dialkyl disulfide and/or diaryl sulfide.

Preferred regulators are mono-, bi- and polyfunctional mercaptans, mercaptoalcohols and/or mercaptocarboxylic acids. Examples of these compounds are allyl thioglycolates, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea and alkyl mercaptans such as n-butyl mercaptan, n-hexyl mercaptan or n-dodecyl mercaptan.

Examples of bifunctional regulators which comprise two sulfur atoms in bound form are bifunctional thiols, for example dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolate and butanediol bisthioglycolate. Examples of polyfunctional regulators are compounds which comprise more than two sulfur atoms in bound form. Examples thereof are trifunctional and/or tetrafunctional mercaptans.

Examples of phosphorus compounds which can be used as regulators comprise phosphates, hydrogenphosphates, phosphorous acid, hypophosphorous acid and salts thereof, especially phosphites and/or hypophosphites.

Particularly preferred for performance of the present invention are mercaptoethanol, sodium bisulfite and sodium hypophosphite.

According to the invention, at least one water-soluble initiator or a water-soluble initiator system is additionally used. Useful for this purpose are in principle all water-soluble initiators which are known for the free-radical polymerization of ethylenically unsaturated monomers and can thermally initiate free-radical polymerization. Suitable water-soluble initiators are known in principle to the person skilled in the art, and are selected suitably according to the desired reaction conditions. Particular attention will be paid to selecting thermal initiators with an appropriate half-life at the desired polymerization temperature. It will be appreciated that it is also possible to use mixtures of different initiators.

The amount of initiator is typically 0.1 to 20% by weight, particularly 0.2 to 10% by weight and especially 0.5 to 5% by weight, based on the total amount of the monomers to be polymerized.

Suitable thermal initiators comprise especially initiators based on organic or inorganic peroxides, azo initiators or redox initiator systems. Specific examples of suitable polymerization initiators are specified below:

Peroxide compounds: These include, for example, organic peroxides and hydroperoxides such as acetyl peroxide, benzoyl peroxide, lauroyl peroxide, tert-butyl peroxyisobutyrate, caproyl peroxide, cumene hydroperoxide, di-tert-butyl peroxide, tert-butyl hydroperoxide, tert-amyl hydroperoxide, tert-butyl peroxyacetate, tert-butyl peroxybenzoate, tert-butyl peroxyoctoate, tert-butyl peroxyneodecanoate, tert-amyl peroxypivalate, tert-butyl peroxypivalate, diisopropyl peroxydicarbonate, dicyclohexyl peroxydicarbonate, dicumyl peroxide, dibenzoyl peroxide, dilauroyl peroxide; inorganic peroxides such as hydrogen peroxide, peroxodisulfuric acid and salts thereof, such as ammonium peroxodisulfate, sodium peroxodisulfate and potassium peroxodisulfate;

Azo compounds: These include, for example, 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamidine)dihydrochloride, 2,2'-azobis[N-(2-carboxyethyl)-2-methylpropionamidine]hydrate, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis(1-imino-1-pyrrolidino-2-ethylpropane)dihydrochloride, 2,2'-azobis{2-methyl-N-[1,1-bis(hydroxymethyl)-2-hydroxyethyl]propionamide}, 2,2'-azobis[2-methyl-N-(2-hydroxyethyl)propionamide], 1-[(1-cyano-1-methylethyl)azo]formamide, dimethyl 2,2'-azobis(2-methylpropionate), 1,1'-azobis(cyclohexane-1-carbonitrile) or 4,4'-azobis(4-cyanopentanoic acid).

Redox initiators: This is understood to mean initiator systems which comprise an oxidizing agent, for example a salt of peroxodisulfuric acid, hydrogen peroxide or an organic peroxide such as tert-butyl hydroperoxide, and a reducing agent. As reducing agents, they preferably comprise a sulfur compound which is especially selected from sodium hydrogensulfite, sodium hydroxymethanesulfinate and the hydrogensulfite adduct onto acetone. Further suitable reducing agents are nitrogen and phosphorus compounds such as phosphorous acid, hypophosphites and phosphinates, di-tert-butyl hyponitrite and dicumyl hyponitrite, and also hydrazine or hydrazine hydrate and ascorbic acid. Redox initiator systems may additionally comprise an addition of small amounts of redox metal salts such as iron salts, vanadium salts, copper salts, chromium salts or manganese salts, for example the ascorbic acid/iron(II) sulfate/sodium peroxodisulfate redox initiator system.

Particularly preferred for performance of the present invention are sodium peroxodisulfate, potassium peroxodisulfate, ammonium peroxodisulfate, 2,2'-azobis[2-(2-imidazolin-2-yl)propane]dihydrochloride, 2,2'-azobis[2-(2-imidazolin-2-yl)propane]disulfate dihydrate, 2,2'-azobis(2-methylpropionamidine)dihydrochloride or 2,2'-azobis[2-(2-imidazolin-2-yl)propane.

Apparatus Used

According to the invention, free-radical polymerization is conducted by means of a continuous process. In this process, the starting materials used are first mixed continuously with one another in process step (Ia) and then polymerized continuously in process step (Ib). For the mixing and polymerization, at least one mixer with microstructures and at least one reactor with microstructures are preferably used here in each case.

Apparatus with microstructures differs from conventional apparatus by the characteristic dimension thereof. The characteristic dimension of a flow device, for example of a mixer or of a reactor, is understood in the context of the present invention to mean the smallest extent at right angles to the flow direction. The characteristic dimension of microapparatus is significantly smaller than that of conventional apparatus. It may especially be in the micrometer to millimeter range. Compared to conventional reactors, microapparatus therefore exhibits significantly different behavior in relation to the heat and mass transfer processes which proceed. By virtue of the greater ratio of surface area to reactor volume, for example, very good heat supply and removal are enabled, and it is therefore also possible to perform highly endo- or exothermic reactions virtually isothermally.

Mixer:

According to the invention, the reactants and water are mixed continuously with one another in a mixing apparatus comprising at least one mixer. This involves introducing streams of the reactants and water into the mixing apparatus, and a stream of the aqueous reaction mixture is obtained, which is polymerized in a downstream polymerization apparatus. It will be appreciated that it is possible to use a combination of a plurality of mixers. These may in principle be mixers with or without microstructures, provided that the process parameters specified below can thus be observed.

"Conventional" mixers in the context of the present invention refer to mixers which do not possess microstructures—as defined below. Examples of suitable mixers without microstructures are both conventional dynamic mixers, for example mixing pumps and continuous flow stirred tanks, and mixing apparatus incorporated into pipelines, for example baffles, restrictors, jet mixers, T and Y pieces and static mixers.

Conventional mixers differ from mixers with microstructures by their characteristic dimension. The characteristic dimension of a flow device, for example of a mixer, is understood in the context of the present invention to mean the smallest extent at right angles to the flow direction. The characteristic dimension of a micromixer is significantly smaller than that of a conventional mixer and is typically in the micrometer to millimeter range.

Conventional mixers have a characteristic dimension within the range relevant for mixing of more than 10 mm, and mixers with microstructures, in contrast, of not more than 10 mm. The characteristic dimension of a mixer with microstructures used in accordance with the invention is preferably in the range from 1 μm to 10 000 μm, more preferably in the range from 10 μm to 5000 μm and especially in the range from 25 μm to 4000 μm. The optimal characteristic dimension is determined here from the requirements on the mixing quality and the proneness of the mixing apparatus to blockage. Mixers with microstructures are also referred to as micromixers.

Examples of suitable micromixers are:
I static mixers
  1. laminar diffusion mixers
    a) "chaotic-laminar" mixers, for example T mixers, Y mixers or cyclone mixers
    b) multilamination mixers or interdigital mixers
  2. laminar diffusion mixers with convective cross-mixing, for example shaped mixing channels or channels with secondary structures
  3. split-recombine mixers, for example caterpillar mixers
II dynamic mixers, for example mixing pumps
III combinations thereof, or
IV turbulent mixers, each of which satisfy the abovementioned conditions for the characteristic dimensions.

In a suitable embodiment, mixers with microstructures which have at least one mixing channel are used. The mixing may be laminar, laminar-chaotic or turbulent.

Micromixers preferred in accordance with the invention are explained in detail hereinafter.

In laminar diffusion mixers, substreams of the fluid which has been fanned out in a microstructure into a multitude of microscopically small flow lamellae with a thickness in the range from 10 to 2000 μm, especially 20 to 1000 μm and particularly 40 to 500 μm, are mixed exclusively by molecular diffusion at right angles to the main flow direction. The mixer can be designed via the Fourier number $Fo=\tau/\tau_D$, which is the ratio of residence time in the mixer to the diffusion time between the individual flow lamellae. For the diffusion time $\tau_D$, $$\tau_D = \frac{s^2}{D},$$

in which s is half the flow lamellae thickness [m] and D is the diffusion coefficient [m²/sec]. This ratio is generally selected to be greater than 1, preferably greater than 2, more preferably greater than 3 and especially greater than 4, in order to ensure very good molecular mixing of the streams at the outlet of the mixer.

Chaotic-laminar diffusion mixers may be configured as simple T or Y mixers, or as so-called multilamination mixers. In the case of the T or Y mixer, the two (or else more than two) substreams to be mixed are fed to a single channel through a T- or Y-shaped arrangement. The crucial factor for the transversal diffusion distance $S_{Diff}$ here is the channel width $\delta_K$. Typical channel widths between 100 μm and 1 mm give rise to mixing times customary for liquids in the range from seconds to minutes. When, as in the present process, liquids are mixed, it is advantageous to promote the mixing operation additionally, for example by means of flow-induced transverse mixing.

In the case of multilamination mixers or interdigital mixers, the substreams to be mixed are divided in a distributor into a large number of microflow threads and, at the exit of the distributor, are then fed to the mixing zone alternately in lamellae. For liquids, mixing times in the range of seconds are achieved with the conventional multilamination mixers. Since this is insufficient for some applications (for example in the case of fast reactions), the basic principle has therefore been developed further by focusing the flow lamellae once again additionally by geometric or hydrodynamic means. The geometric focusing is achieved by a constriction in the mixing zone. The hydrodynamic focusing is achieved by two lateral streams which flow toward the main stream at right angles and thus further compress the flow lamellae. The focusing described allows lateral dimensions of the flow lamellae of a few micrometers to be achieved, such that even liquids can be mixed within a few 10 s of ms.

The laminar diffusion mixers with convective crossmixing used may be micromixers with structured walls. In the case of micromixers with structured walls, secondary structures (grooves or projections) are disposed on the channel walls. They are preferably arranged at a particular angle to the main flow direction, for example at an angle of about 30° up to 90°. In the case of inertia-dominated flow conditions, secondary vortices form as a result, which promote the mixing process.

In a further suitable embodiment, the mixer with microstructure used is a split-recombine mixer. Split-recombine mixers are notable for stages composed of recurrent separation and combination of streams. Two regions of an unmixed fluid stream (it is usual to start from two equally large lamellae) are each conducted away from one another in one stage, distributed into two new regions in each case, and combined again. All four regions are arranged alongside one another in alternation such that the original geometry is re-established. In each of these stages, the number of lamellae is thus doubled stage by stage, and lamella thickness and diffusion distance are thus halved.

Examples of suitable split-recombine mixers are the caterpillar mixer from IMM and the caterpillar mixer from BTS-Ehrfeld.

Examples of suitable dynamic micromixers are, for example, micro-mixing pumps.

Examples of preferred static micromixers are especially the following laminar diffusion mixers:
"chaotic-laminar" mixers, for example T or Y pieces with a very small capillary diameter in the range from 100 μm to 1500 μm and preferably 100 μm to 800 μm at the mixing point, and cyclone mixers;
multilamination mixers, for example the LH2 and LH25 slit plate mixers or larger types from Ehrfeld, and the SIMM and Starlam® interdigital mixers from IMM;
micromixers according to the multilamination principle with superimposed expanded flow, for example the SuperFocus Interdigital SFIMM microstructure mixer from IMM.

Turbulent mixers are based on the principle of turbulent mutual penetration of liquid jets. These may be free liquid jets which can be generated by compressing the liquid through suitable nozzles. The jets hit one another, which brings about the mixing. Such mixers are also known as "impinging jet micromixers". The principle may also be that conducted jets penetrate turbulently at the meeting point. Such a mixer consists of a plurality of plates which have fine channels and are arranged one top of another. For the mixing, a liquid stream is divided into many substreams by means of the channels and the liquid streams hit the liquid streams from plates above or below. This gives rise to strong microturbulences, which ensure rapid and good mixing. Details of such mixers are disclosed, for example, by WO 2005/018786 A1.

In the case of mixers with microstructures, it is advisable to provide filters upstream of the microstructured parts of the mixers in order to prevent blockages by particulate impurities, although this is not always absolutely necessary.

According to the invention, the reactants are mixed at a temperature $T_M$ below the desired reaction temperature $T_{target}$, and further preferably, for instance, at room temperature. To maintain the desired mixing temperature, the mixers used may be in contact with a suitable temperature control medium. This allows heat of mixing formed to be removed efficiently. In this case, temperature differences within the mixing space and temperature differences between temperature control medium and the mixture in the mixing space should be at a minimum. In general, $\Delta T$ within the mixing space should not be greater than 5 K.

Reaction Zone:

A reaction zone in the context of the present invention is understood to mean a section of a reactor in which the polymerization proceeds, in flow direction of liquid streams. A reaction zone may be arranged within one part of a reactor, within an overall reactor or within two or more reactors. In a preferred embodiment, each reaction zone is in a separate reactor.

The reaction zones may in principle be reaction zones with or without microstructures, provided that the process parameters specified below can thus be observed.

Preference is given to using at least one reactor with at least one reaction zone with microstructures for the polymerization. The reactor with one reaction zone with microstructures is also referred to here and hereinafter as a reactor with microstructures, microstructured reactor or microreactor. Microstructured reactors are suitable for ensuring thermal homogeneity at right angles to flow direction. In principle, each differential volume element has essentially the same temperature over the particular flow cross section.

Conventional reactors and microreactors differ by their characteristic dimension and especially by the characteristic dimension of their reaction zones. In the context of the present invention, the characteristic dimension of a device, for example of a reactor, is understood to mean the smallest extent at right angles to the flow direction. The characteristic dimension of the reaction zone of a microreactor is significantly less than that of a conventional reactor and is typically in the range from 100 s of nanometers to a few 10 s of millimeters. It is frequently in the range from 1 μm to 30 mm. Compared to conventional reactors, microreactors therefore exhibit significantly different behavior in relation to the heat and mass transfer processes which proceed. As a result of the greater ratio of surface area to reactor volume, for example, very good heat supply and removal is enabled, which is why it is also possible to carry out strongly endo- or exothermic reactions virtually isothermally.

Conventional reactors have a characteristic dimension of >30 mm, microreactors, in contrast, ≤30 mm. In general, the characteristic dimension of the reaction zone of a reactor with microstructures is at most 30 mm, for example 0.1 to 30 mm or preferably 0.2 to 30 mm or more preferably 0.4 to 30 mm; preferably at most 20 mm, for example 0.1 to 20 mm or preferably 0.2 to 20 mm or more preferably 0.4 to 20 mm; more preferably at most 15 mm, for example 0.1 to 15 mm or preferably 0.2 to 15 mm or more preferably 0.4 to 15 mm; even more preferably at most 10 mm, for example 0.1 to 10 mm or preferably 0.2 to 10 mm or more preferably 0.4 to 10 mm; even more preferably at most 8 mm, for example 0.1 to 8 mm or preferably 0.2 to 8 mm or more preferably 0.4 to 8 mm; particularly at most 6 mm, for example 0.1 to 6 mm or preferably 0.2 to 6 mm or more preferably 0.4 to 6 mm; and especially at most 4 mm, for example 0.1 to 4 mm or preferably 0.2 to 4 mm or more preferably 0.4 to 4 mm, and even more especially 0.4 to 3 mm.

Microreactors for use in accordance with the invention are preferably selected from temperature-controllable tubular reactors, tube bundle heat exchangers, plate heat exchangers and temperature-controllable tubular reactors with internals. As characteristic dimensions, tubular reactors, tube bundle heat exchangers and plate heat exchangers for use in accordance with the invention preferably have tube or capillary diameters in the range from 0.1 mm to 25 mm, more preferably in the range from 0.5 mm to 6 mm, even more preferably in the range from 0.7 to 4 mm and especially in the range from 0.8 mm to 3 mm, and layer heights or channel widths in the range from preferably 0.2 mm to 10 mm, more preferably in the range from 0.2 mm to 6 mm and especially in the range from 0.2 mm to 4 mm. Tubular reactors with internals for use in accordance with the invention have tubular diameters in the range from 5 mm to 500 mm, preferably in the range from 8 mm to 200 mm and more preferably in the range from 10 mm to 100 mm. Alternatively, it is also possible in accordance with the invention to use flat channels comparable to plate apparatus with inlaid mixing structures. They have heights in the range from 1 mm to 20 mm, and widths in the range from 10 mm to 1000 mm and especially in the range from 10 mm to 500 mm. Optionally, the tubular reactors may comprise mixing elements permeated by temperature control channels.

The optimal characteristic dimension is determined here from the requirements on the permissible anisothermicity of the reaction, the maximum permissible pressure drop and the proneness of the reactor to blocking.

The reactors here are constructed such that the microreactors are in very good contact with a temperature control medium, such that very good heat transfer is possible between the reaction mixture in the reaction zone with microstructures and the temperature control medium, such that a substantially isothermal reaction regime is possible.

Particularly preferred microreactors are:

tubular reactors composed of capillaries, capillary bundles with tube cross sections of 0.1 to 25 mm, preferably of 0.5 to 6 mm, more preferably of 0.7 to 4 mm, with or without additional mixing internals, where a temperature control medium may flow around the tubes or capillaries;

tubular reactors in which the heat carrier is conducted within the capillaries/tubes, and the product whose temperature is to be controlled is conducted around the tubes and homogenized by internals (mixing elements);

plate reactors which, like plate heat exchangers, are constructed with insulated parallel channels, networks of channels or areas which are equipped with or have no flow-breaking internals (posts), the plates conducting product and heat carrier in parallel or in a layer structure which has alternating heat carrier and product layers, such that chemical and thermal homogeneity can be ensured during the reaction; and reactors with "flat" channel structures which have a "microdimension" only in terms of height and can be virtually as broad as desired, whose typical comb-shaped internals prevent the formation of a flow profile and lead to a narrow residence time distribution which is important for the defined reaction and residence time.

In a preferred embodiment of the invention, at least one reactor which substantially has the residence time characteristic of plug flow is used. When plug flow is present in a tubular reactor, the state of the reaction mixture (for example temperature, composition, etc.) can vary in flow direction, but the state of the reaction mixture is the same for each individual cross section at right angles to the flow direction. All volume elements entering the tube thus have the same residence time in the reactor. In figurative terms, the liquid flows through the tube as if it were an array of plugs sliding easily through the tube. In addition, the crossmixing as a result of the intensified mass transfer at right angles to the flow direction can compensate for the concentration gradient at right angles to the flow direction.

In spite of the usually laminar flow through apparatus with microstructures, backmixing can thus be prevented and a narrow residence time distribution can be achieved in a similar manner to that in an ideal flow tube.

The Bodenstein number is a dimensionless parameter and describes the ratio of the convection flow to the dispersion flow (for example M. Baerns, H. Hofmann, A. Renken, Chemische Reaktionstechnik [Chemical Reaction Technology], Lehrbuch der Technischen Chemie [Textbook of Industrial Chemistry], volume 1, 2nd edition, p. 332 ff). It thus characterizes the backmixing within a system.

$$Bo = \frac{uL}{D_{ax}}$$

where u is the flow rate [ms$^{-1}$], L is the length of reactor [m] and $D_{ax}$ is the coefficient of axial dispersion [m$^2$h$^{-1}$].

A Bodenstein number of zero corresponds to complete backmixing in an ideal continuous stirred tank. An infinitely large Bodenstein number, in contrast, means absolutely no backmixing, as in the case of continuous flow through an ideal flow tube.

In capillary reactors, the desired backmixing behavior can be established by adjusting the ratio of length to diameter as a function of the substance parameters and the flow state. The underlying calculation methods are known to those skilled in the art (for example M. Baerns, H. Hofmann, A. Renken: Chemische Reaktionstechnik, Lehrbuch der Technischen Chemie, volume 1, 2$^{nd}$ edition, p. 339 ff). If very low-backmixing behavior is to be achieved, the above-defined Bodenstein number is preferably selected to be greater than 10, more preferably greater than 20 and especially greater than 50. For a Bodenstein number of greater than 100, the capillary reactor then has substantially plug flow character.

Advantageous materials for the mixers and reactors for use in accordance with the invention have been found to be stainless steels which are austenitic in the region of low temperatures, such as 1.4541 or 1.4571, generally known as V4A and as V2A respectively, and stainless steels of US types SS316 and SS317Ti. At higher temperatures and under corrosive conditions, polyetheretherketones are likewise suitable. However, it is also possible to use more corrosion-resistant Hastelloy® types, glass or ceramic as materials and/or corresponding coatings, for example TiN$_3$, Ni-PTFE, Ni-PFA or the like, for the mixers and reactors for use in accordance with the invention.

In the case of reactors with microstructured reaction zones, it is advisable to provide filters upstream of the microstructured parts of the reaction zones in order to prevent blockages by particulate impurities, although this is not always absolutely necessary.

To heat the reaction mixture to the temperature needed for polymerization and to maintain the desired polymerization temperature, the temperature of each reaction zone is controlled by a temperature control medium of temperature $T_{target}$. This involves heating the reaction mixture, after it flows out of the mixer into the first reaction zone, in a first—viewed in flow direction—region of the reaction zone, and it polymerizes after attaining a temperature sufficient for polymerization in a second—viewed in flow direction—region of the first and possibly further reaction zones arranged downstream in flow direction.

When the polymerization apparatus has more than one reaction zone, these reaction zones may have identical or different temperatures $T_{target}$. The temperatures of zones of different target temperature must of course be controlled by different temperature control media; zones at the same temperature may, according to the construction of the reactor, be controlled by the same or different temperature control media.

The temperature control medium should have a sufficiently high heat capacity, be circulated intensively and be provided with a thermostat unit of sufficient power, and the heat transfer between the reaction zone and the temperature control medium should be as good as possible, in order to ensure very substantially homogeneous temperature distribution in the reaction zone.

For this purpose—according to the exothermicity and characteristic reaction time of the polymerization reaction—the ratio of heat exchange area to reaction volume selected should generally be greater than 250 m$^2$/m$^3$, preferably greater than 500 m$^2$/m$^3$, more preferably greater than 1000 m$^2$/m$^3$ and especially greater than 2000 m$^2$/m$^3$. In addition, the heat transfer coefficient on the part of the reaction medium should generally be more than 50 W/m$^2$K, preferably more than 100 W/m$^2$K, more preferably more than 200 W/m$^2$K and especially more than 400 W/m$^2$K.

As the minimum requirement on the reactor and the temperature control medium, it should be ensured in accordance with the invention that the temperature differences ΔT between $T_{target}$ of the temperature control medium and the actual reaction temperature $T_R$ after passage through the heating zone, at each point within the reaction zone, $|T_R-T_{target}|$, are ≤50 K. The temperature difference is preferably ≤20 K, more preferably ≤10 K and most preferably ≤5 K. The reaction can thus proceed under substantially defined and controlled conditions.

The maximum temperature differences in a flow cross section in the reaction medium at right angles to the main flow direction depend on the polymerization parameters selected. The maximum temperature difference in a flow cross section is preferably less than 15 K, more preferably less than 10 K and most preferably less than 5 K.

To determine the product of volume-specific heat transfer area and heat transfer coefficient, the following relationship can be employed:

$$\alpha \cdot \left(\frac{A}{V}\right) = \frac{\Delta H \cdot \rho}{\Delta T \cdot \Delta t_R}$$

in which
α is the heat transfer coefficient [W/m²K],
A/V is the volume-specific heat transfer area [m²/m³],
ΔH is the reaction enthalpy [J/kg],
ΔT is the maximum permissible temperature difference in the reaction medium [K],
ρ is the partial density of the monomer in the reaction mixture [kg/m³] and
$\Delta t_R$ is the characteristic reaction time [s].

Preferred Polymerization Apparatus:

Over and above mixers and reactors, the apparatus used for free-radical polymerization comprises further customary components such as reactant vessels, product vessels, metering apparatus and connections between the individual apparatus parts.

In a preferred embodiment of the invention, the apparatus comprises
- at least two reservoir vessels for liquid starting materials,
- one feed each for liquid streams from the at least two reservoir vessels,
- one or more mixers connected in series, to which the liquid streams are fed and in which they are mixed to obtain a reaction mixture, at least the last mixer in flow direction before entry into the reaction zone(s) preferably being equipped with microstructures,
- at least one reaction zone, which is preferably a reaction zone with microstructures, and
- an output vessel which is optionally provided with one or more addition and/or mixing apparatuses.

In a second embodiment of the invention, the apparatus comprises
- at least three reservoir vessels for liquid starting materials,
- one feed each for liquid streams from the at least three reservoir vessels,
- one or more mixers connected in series, to which the liquid streams are fed and in which they are mixed to obtain a reaction mixture, at least the last mixer in flow direction before entry into the reaction zone(s) preferably being equipped with microstructures,
- at least one reaction zone, which is preferably a reaction zone with microstructures, and
- an output vessel which is optionally provided with one or more addition and/or mixing apparatuses.

In a further suitable embodiment, the apparatus comprises two reaction zones, at least one of which has microstructures, preferably both.

In a likewise suitable embodiment, the apparatus has at least one further feed for a liquid monomer stream which is arranged downstream of a reaction zone and which is followed downstream in flow direction by at least one further reaction zone.

In a suitable configuration, this apparatus has at least one further feed for a liquid additive stream, which is arranged downstream of the last reaction zone in flow direction.

In a further suitable configuration of this apparatus, the further liquid stream supplied and the output from the reaction zone to which the feed is connected are conducted into a mixer with microstructures and mixed therein.

Polymerization Process:

According to the invention, the continuous process for polymerization comprises at least two steps, specifically
(Ia) continuous mixing of the reactants and water in a mixing unit comprising at least one mixer, and
(Ib) continuous free-radical polymerization of the resulting reaction mixture in at least one reaction zone.

Process Step (Ia)

In step (Ia), at least acrylic acid, water, an initiator and at least one regulator are mixed continuously with one another. It will be appreciated that it is also possible for further components, for example further comonomers or further solvents, likewise to be mixed with the other components in process step (Ia). In general, the reactants are used in the form of aqueous solutions, but it is conceivable to use liquid starting materials, for example acrylic acid or a liquid regulator in substance. Water is typically not metered in separately, but water is instead metered in in the form of the aqueous solutions of the reactants. However, it will be appreciated that it is also conceivable to meter in water in an additional, separate stream.

The reactants and prepared mixtures or solutions can be stored in suitable reservoir vessels, and, for the mixing, at least two liquid streams of the reactants including water are metered into the mixer. The distribution of the reactants between the at least two liquid streams can be undertaken by the person skilled in the art, with the proviso that the components should not adversely affect one another. More particularly, the stream comprising the initiator should not also comprise the regulator.

Preferably, at least three liquid streams are mixed with one another, specifically an acrylic acid-containing stream, an initiator-containing stream and a regulator-containing stream.

In this case, preferably at least the acrylic acid and the initiator are each mixed separately with water. The regulator may likewise be dissolved in water, but can optionally also be used without additional solvent. The three liquid components are each metered into the mixing apparatus as a continuous stream.

The mixing can be effected in one stage in only one mixer, but it is also possible to use a mixing apparatus which possesses more than one mixer. In this case, it is possible, for example, to mix two streams by means of a first mixer, and to mix the resulting mixture with a third liquid stream in a second mixer. In a preferred embodiment of the invention, an acrylic acid-containing stream, preferably an acrylic acid-water mixture, and an initiator-containing stream, preferably an aqueous solution of the initiator, can be mixed with one another, and the resulting aqueous mixture can be mixed in a second mixer with a regulator-containing stream, preferably an aqueous solution of the regulator.

The mixers used may either be conventional mixers or mixers with microstructures. Both types of mixers and specific embodiments have already been described. At least one of the mixers used is preferably a mixer with microstructures, more preferably all mixers used. In another, preferred embodiment, the liquid streams are mixed in more than one stage, i.e. using one mixing apparatus with a plurality of mixers, in which case at least the last mixer in flow direction before entry into the reaction zone(s) is a mixer with microstructures.

Irrespective of the type of mixer, however, it must be ensured in accordance with the invention that the mixing temperature $T_M$ is less than the target temperature $T_{target}$ in the downstream process step (Ib). When $T_M$ in the mixing space is not homogeneous but has a certain spatial distribution, $T_M$ relates to the highest temperature existing in the mixing space.

In addition, the mixing temperature should be such that there is no significant conversion in the mixing zone, and the formation of polyacrylic acid instead takes place only at the desired temperature in the at least one reaction zone. The conversion of acrylic acid within the mixing zone should generally be <2%, preferably <1%.

The difference $T_{target}-T_M$ is preferably ≥10 K, more preferably ≥20 K and most preferably ≥30 K. Moreover, the mixing temperature should preferably be 10 to 30° C., more preferably about room temperature (18 to 22° C.).

The temperature of the mixture within the mixing unit or the individual mixers may, if required, be ensured by means of temperature control media which are in contact with the mixers. By their nature, the heat exchange is particularly good in mixers with microstructures, and any heat of mixing formed can thus be removed rapidly.

The concentration of the monomers in the reaction mixture should preferably be such that a polyacrylic acid solution is obtained in the desired concentration and need not be concentrated for use. In general, the concentration of the acrylic acid and optionally of further monomers in the reaction mixture is 10 to 80% by weight based on all components of the reaction mixture, preferably 20 to 70% by weight and more preferably 30 to 60% by weight. Preferred amounts of regulator and initiator have already been mentioned at the outset.

Process Step (Ib)

After the mixing, a stream of the aqueous reaction mixture is passed continuously through at least one reaction zone, in which the acrylic acid and optionally further, ethylenically unsaturated comonomers polymerize by a free-radical mechanism.

The temperature of the reaction zone here is controlled by a temperature control medium of temperature $T_{target}$. Details of the temperature control medium have already been outlined. After the reaction mixture flows out of the mixer into the first reaction zone, the mixture is heated in a first—viewed in flow direction—region of the reaction zone and polymerizes after attaining a temperature sufficient for polymerization in a second—viewed in flow direction—region of the first reaction zone and optionally further reaction zones downstream thereof.

$T_{target}$ here is in the range from 10° C. to 200° C., preferably 50° C. to 200° C., more preferably 50° C. to 150° C., most preferably 60° C. to 130° C. and, for example, 80° C. to 120° C. $T_{target}$ is selected by the person skilled in the art according to the desired polymerization conditions and is guided, for example, by the nature of the initiator selected, the flow rate or the type of reactor.

Figure 2:
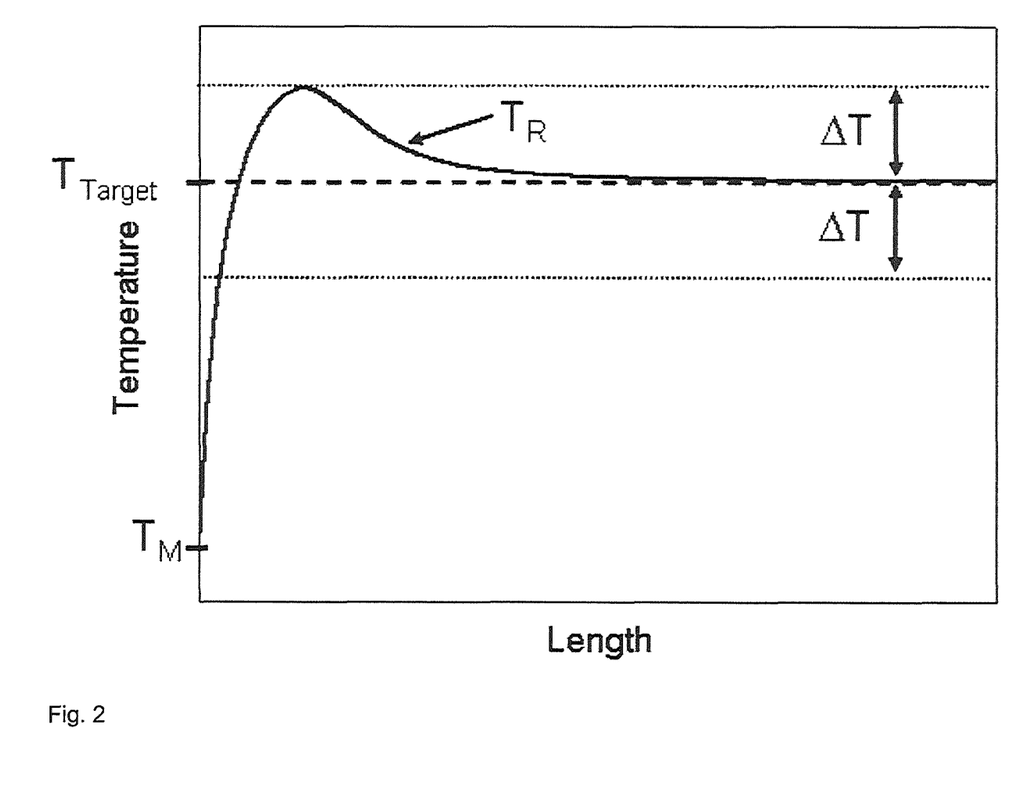
FIG. 2: schematic diagram of a typical plot of the reaction temperature $T_R$ within the reaction zone

A typical temperature profile during the polymerization is shown schematically in FIG. 2. The x axis ("length") refers to the extent of the reaction zone in flow direction. The reaction mixture flows with the temperature $T_M$ into the reaction zone whose temperature is controlled by a temperature control medium with temperature $T_{target}$. $T_{target}$ is adjusted to the desired polymerization temperature. As it flows through a first region of the reactor, the reaction mixture is heated by the temperature control medium. During the heating, there is still no or at least essentially no polymerization. After the attainment of a temperature sufficient for polymerization, i.e. from a temperature at which the initiator decomposes at a significant rate, the polymerization commences. As a result of the exothermic polymerization, the actual temperature $T_R$ of the reaction mixture rises above $T_{target}$ and is cooled by the now colder temperature control medium. As a result, the temperature $T_R$—viewed in flow direction—gradually approaches $T_{target}$ again. The transition between the heating zone and the actual polymerization zone is of course fluid. In an approximate consideration, the start of the actual reaction zone can be considered to be that point at which $T_R$, in the course of heating, exceeds the value of $T_{target}-\Delta T$ (as defined below).

According to the invention, after flow through the heating zone, the temperature difference $\Delta T$ between $T_{target}$ and the actual reaction temperature $T_R$, at any point in the reaction zone downstream of the heating zone, $|T_R-T_{target}|$, is ≤50 K, preferably ≤20 K, more preferably ≤10 K and most preferably ≤5 K. The temperature should thus, after the heating of the reaction mixture, i.e. during the actual polymerization, always vary within a range $T_{target}+/-\Delta T$. The temperature control medium can be conducted in cocurrent or countercurrent to the reaction medium.

The residence time $t_R$ within a reaction zone is generally 5 s to 30 min, preferably 10 s to 15 min and especially ½ min to 10 min.

When the polymerization apparatus has more than one reaction zone, the temperatures of these reaction zones may be controlled to identical or different target temperatures $T_{target}$. Zones of different $T_{target}$ must of course be controlled by different temperature control media; zones of equal temperature may, according to the construction of the reactor, be controlled by the same temperature control medium or by different temperature control media.

The pressure in the course of the polymerization can be varied within wide ranges. At least a sufficiently high pressure that the reaction mixture can be forced through the reaction zone(s) is employed, the flow resistance of the reaction zone(s) and hence the necessary pressure naturally increasing with decreasing diameter of the reaction zone(s). It may thus be considerable especially in the case of reactors with microstructures. Equally naturally, it is also possible for considerable pressure gradients to occur here. The smallest pressure in the reaction zone is selected such that it is significantly above the vapor pressure of monomer(s) and solvent(s), in order to prevent uncontrolled degassing with formation of an undefined residence time behavior.

In the case that more than one reaction zone is used, it is possible in one embodiment of the invention to mix in at least one additional liquid stream between at least two of the reaction zones. These may, for example, be a monomer-containing stream, initiator-containing stream, solvent-containing stream, regulator-containing stream, a mixture thereof and/or any other further stream. A further stream may, for example, be an aqueous base with which the monomers and/or polymers formed can be completely or partly neutralized.

In a suitable embodiment, the additional stream(s) is/are mixed in using a mixer with microstructures. In a likewise suitable embodiment, for the mixing of this additional stream or of these additional streams and for the further reaction, at least one reactor, preferably a reactor with mixing function, optionally a microstructured reactor with mixing function, is used.

Figure 3:
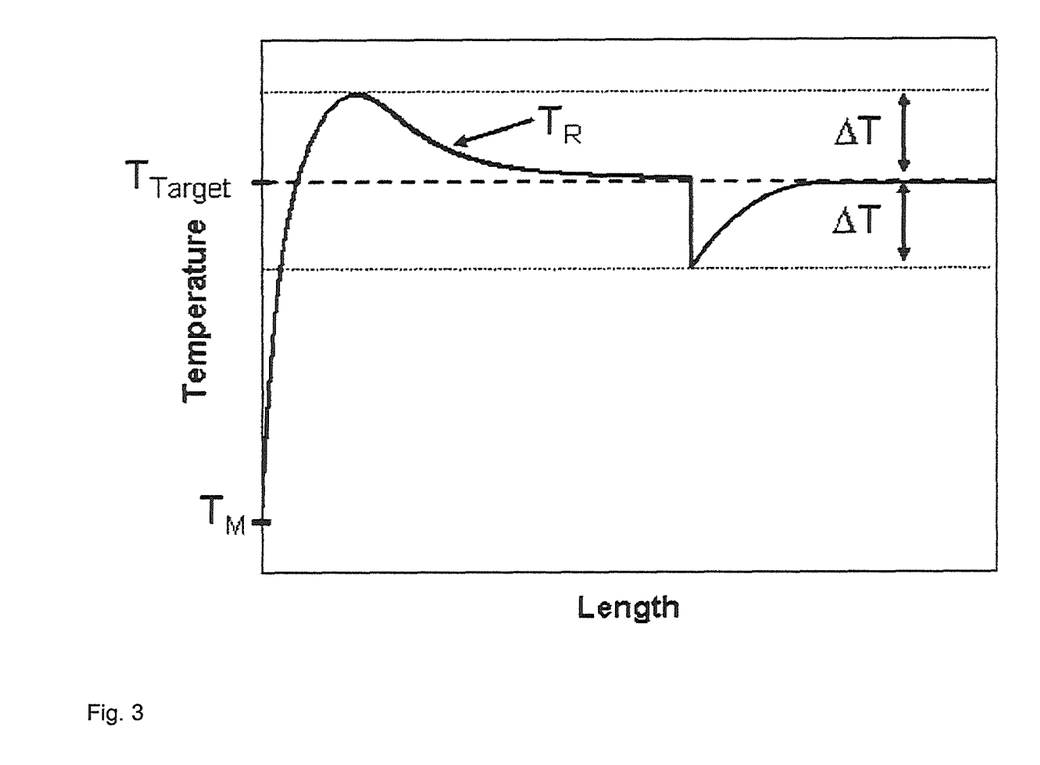
FIG. 3: schematic diagram of a typical profile of the reaction temperature $T_R$ within the reaction zone in the case of metered addition of a further component into the reaction zone With regard to the invention, the following can be stated explicitly.

One example of a typical temperature profile in the case of further metering is shown in FIG. 3. After an additional stream with lower temperature than $T_{target}$ is mixed in, the temperature at first falls below $T_{target}$ and then approaches $T_{target}$ again. Other temperature profiles are of course also possible, for example such that the temperature at first decreases but then, owing to exothermic reaction, overshoots $T_{target}$ and only then approaches $T_{target}$ again. According to the type of additional stream, the inlet temperature of a stream metered in can of course be controlled, for instance, to $T_{target}$, such that no further significant deviations from $T_{target}$ occur at the metering site in the reaction zone.

To achieve very pure polyacrylic acid homo- or copolymers with low residual monomer content, the polymerization (main polymerization) may be followed by a further polymerization step. The further polymerization can be effected in the presence of the same initiator system as, or of a different initiator system than, the main polymerization. The further polymerization is preferably effected at least at the same temperature as, preferably at a higher temperature than, the main polymerization.

Process Step (II): Removal of Low Molecular Weight Components:

In a further process step (II) after the polymerization, low molecular weight components are at least partly removed from the resulting aqueous polymer solution, preferably by means of physical or physicochemical methods. This process step may directly follow the polymerization, or the aqueous polyacrylic acid solution can first be stored intermediately and the additional process step can be performed at some later time. The removal of low molecular weight components can be conducted continuously or batchwise.

Low molecular weight components are molecules with a molar mass of ≤1000 g/mol, preferably ≤500 g/mol and especially ≤300 g/mol. They may be residues of the regulator, especially residues of sulfur-containing regulators and especially preferably mercaptans, which are used as regulators. They may additionally be decomposition products of the regulator, for example hydrogen sulfide or conversion products thereof. Further examples of low molecular weight components comprise unpolymerized monomers, acrylic acid oligomers or polymer fragments. Such low molecular weight components may be extremely undesired in the end product, for example because they have an unpleasant odor or are disruptive in the use of the product for another reason.

However, the term "low molecular weight components" does not mean water or organic solvents used optionally in a mixture with water, although this should not rule out the possibility that portions of water and/or solvents might also be removed in the course of the removal.

Process step (II) can especially be used to deodorize the polyacrylic acid. "Deodorization" is understood by the person skilled in the art to mean the removal and/or deactivation of volatile components of a substance mixture which cause a troublesome odor and/or disrupt the use of the substance mixture.

The removal of low molecular weight components can in principle be undertaken by any physical or physicochemical separating methods. Examples of such separating methods include distillative removal, removal by extraction using steam, inert gases or solvents (both liquid-liquid and liquid-gas), absorption methods, chromatographic methods or osmotic methods, for example ultrafiltration. It will be appreciated that it is also possible to combine a plurality of removal methods with one another.

In a preferred embodiment of the invention, the removal of low molecular weight components is conducted by means of stripping by means of steam. The person skilled in the art is aware of suitable methods for steam stripping. By way of example, with regard to possible embodiments, reference is made to DE 1 248 943, DE 196 21 027 A1, DE 197 16 373 A1 or EP 967 232 A1.

In the case of stripping with steam, steam can be passed, for example, through the aqueous polymer solution. To this end, the polymer solution can be heated to boiling temperature, or is heated to boiling temperature by the hot steam. The amount of steam passed through is generally 50 to 1000% by weight, based on the amount of the aqueous polymer solution, preferably 100 to 500% by weight. Stripping with steam can also be conducted, for example, in columns. Stripping with steam is effected generally at a pressure of 0.1 to 50 bar, preferably 0.2 to 30 bar and more preferably 0.5 to 10 bar.

In a further preferred embodiment of the invention, the removal of low molecular weight components is conducted by means of ultrafiltration. The person skilled in the art is aware of suitable methods for ultrafiltration. By way of example, with regard to possible embodiments, reference is made to U.S. Pat. No. 5,055,197 or EP 1 024 150 A1. For ultrafiltration, membranes which can remove substances with an $M_n$ of ≤1000 g/mol are used. The person skilled in the art is aware of such membranes. The ultrafiltration can be conducted, for example, at a pressure of 0.1 to 50 bar.

Resulting Polyacrylic Acid Homo- or Copolymers:

The resulting homopolymers or copolymers of acrylic acid preferably have a number-average molecular weight $M_n$ (determinable by means of gel permeation chromatography, GPC; English: size exclusion chromatography, SEC in an aqueous medium) in the range from 1000 g/mol to 20 000 g/mol, preferably in the range from 1000 g/mol to 10 000 g/mol and more preferably in the range from 1000 g/mol to 8000 g/mol. In addition, the ratio of the weight-average molar mass to the number-average molar mass, $M_w/M_n$, is preferably ≤2.5, more preferably ≤2.2 and most preferably ≤2.0.

The concentration of the homo- or copolymer in the aqueous solution is typically 10 to 80% by weight based on all constituents of the aqueous solution, preferably 30 to 55% by weight and more preferably 35 to 52% by weight. They are preferably processed directly in the form of solution.

The liquid polymer compositions obtained can optionally be converted to powder form by various drying processes, for example spray drying, spray fluidized bed, roller drying or freeze drying. Preference is given to using spray drying. The dry polymer powders thus obtained can advantageously be converted again to a polymer solution by dissolving in a suitable solvent.

Use of the Polymer Solutions:

The homo- or copolymers of acrylic acid prepared by the process according to the invention are particularly suitable as dispersants for pigments. For this purpose, preference is given to using inorganic pigments, for example calcium carbonate, kaolin, titanium dioxide, zinc oxide, zirconium oxide, aluminum oxide, etc. Particular preference is given to ground calcium carbonate (GCC). The aim is the preparation of aqueous suspensions of the abovementioned pigments (known as pigment slurries).

The homo- or copolymers of acrylic acid prepared by the process according to the invention can more preferably be used to prepare calcium carbonate slurries, especially as a grinding aid for the wet grinding of calcium carbonate.

The calcium carbonate may be present in natural form as limestone, chalk or marble, or in synthetic form as precipitated calcium carbonate.

The grinding is performed continuously or batchwise in aqueous suspension. The calcium carbonate content in this suspension is generally ≥50% by weight, preferably ≥60% by weight and more preferably ≥70% by weight. Typically, based in each case on the calcium carbonate present in the suspension, 0.1 to 2% by weight, preferably 0.3 to 1.5% by weight, of the polyacrylic acids for use in accordance with the invention is used. Preferably, 95% of the particles in these calcium carbonate slurries after grinding have a particle size of less than 2 µm, and 75% of the particles have a particle size of less than 1 µm. In this case, dispersion and grinding are particularly energy-efficient, and it is possible to achieve a homogeneous size distribution of the pigments. Moreover, the grinding time can be reduced, and the resulting suspension has a low viscosity. The resulting calcium carbonate slurries have excellent rheological properties and are still pumpable even after storage for 24 hours. They are additionally stable for long periods, i.e. the rise in viscosity with time is very low.

The calcium carbonate suspensions prepared using the acrylic acid homo- or copolymers prepared by the process according to the invention can be used in an outstanding manner as white pigments in papermaking and in paints, and as fillers in thermoplastics. If desired, they can be converted to powder form before use by various drying processes, for example spray drying, roller drying or paddle drying.

The resulting polyacrylic acid homo- or copolymers can, however, of course also be used for other purposes, for example in washing compositions, dishwashing detergents, industrial cleaners, for water treatment or as oil field chemicals.

Figure 1:
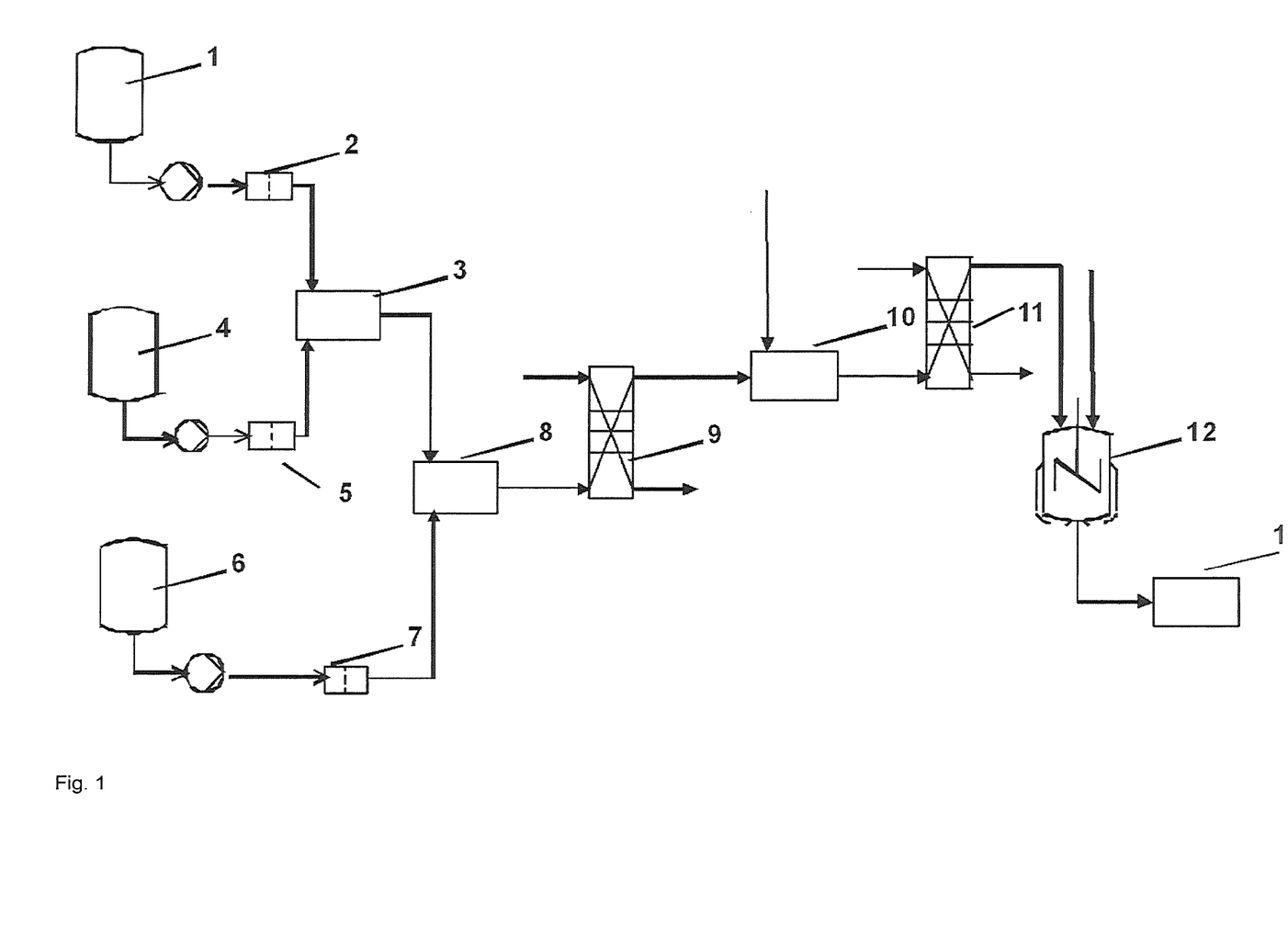
FIG. 1: schematic diagram of a preferred apparatus for performing the process

Preferred Apparatus for Performing the Continuous Process According to the Invention A preferred apparatus for performing the continuous free-radical polymerization is explained in detail hereinafter with reference to FIG. 1. The reference numerals have the meanings specified below:

1 reservoir vessel
2 filter
3 mixer, optionally with microstructure
4 reservoir vessel
5 filter
6 reservoir vessel
7 filter
8 mixer with microstructure
9 microstructured reactor, temperature-controllable
10 mixer, optionally with microstructure, temperature-controllable
11 reactor, optionally microstructured, temperature-controllable
12 output vessel with stirrer apparatus, temperature-controllable
13 apparatus for removing low molecular weight components A mixture of acrylic acid and water and optionally further comonomers is conducted from a reservoir vessel 1 with customary metering and regulating devices through a filter 2 into a mixer 3. The mixer 3 can optionally be configured as a mixer with microstructure. An initiator-water mixture is likewise fed into the mixer 3 from a reservoir vessel 4 via customary metering and regulating devices and a filter 5. The two liquid streams are mixed in the mixer 3 at ambient temperature.

The mixture obtained from the mixer 3 is fed into a mixer 8. A regulator is likewise fed into the mixer 8 from a reservoir vessel 6 via customary metering and regulating devices and a filter 7. The mixer 8 is configured as a mixer with microstructure. The two streams are mixed at ambient temperature in the mixer 8.

Both mixing operations can alternatively also be performed together in one mixing apparatus (3+8).

The mixers 3 and 8 are, or the mixing apparatus (3+8) is, followed downstream by a microstructured reactor 9 which is temperature-controllable and is operated at virtually constant temperature, i.e. substantially isothermally.

The reactor 9 may optionally be followed downstream by a third temperature-controllable mixer 10 in order to add additives, further initiator solutions, etc. The mixer 10 may optionally be configured as a mixer with microstructure.

Likewise optionally, the third mixer 10 may be followed downstream by a further temperature-controllable reactor 11. This reactor 11 may optionally be configured as a microstructured reactor.

Subsequently, the product can be passed into a temperature-controllable output vessel 12 with optional stirrer apparatus. It is optionally possible here to meter in further additives, etc.

In the downstream apparatus 13, low molecular weight components from the polymer solution are at least partly removed.

The examples which follow are intended to illustrate the invention:

Preparation of Polyacrylic Acid:

Polymer 1:

An aqueous solution of acrylic acid (52% by weight of acrylic acid) was mixed continuously with a 3% by weight aqueous initiator solution (2,2'-azobis[2-(2-imidazolin-2-yl)propane]dihydrochloride) by means of a micromixer at room temperature. The flow rate of the acrylic acid solution here was 410 g/h and that of the initiator solution 36 g/h. The resulting mixture was subsequently mixed with a stream of 43 g/h of a 20% by weight aqueous solution of mercaptoethanol (regulator) by means of a second micromixer at room temperature. The resulting reaction mixture was subsequently pumped with a constant flow rate through two series-connected static mixer reactors each with a reaction volume of approx. 10 ml and made of stainless steel (1.4571), which had been preheated to 80° C. The residence time of the reaction mixture in the reaction zone was about 2½ min. Subsequently, in a series-connected reaction capillary made of stainless steel (1.4571) with internal diameter 3 mm and length 10 m, which had been preheated to 80° C., neutralization was carried out with an aqueous sodium hydroxide solution (50% by weight), with an established flow rate of 72 g/h. The properties of the resulting polymers are compiled in Table 1.

The resulting polyacrylic acid solution was aftertreated in various ways.

Polymers 2 to 4:

An aqueous solution of acrylic acid (approx. 44% by weight of acrylic acid) was mixed continuously with a 3% by weight aqueous initiator solution (ammonium peroxodisulfate) by means of a micromixer at ambient temperature. The flow rate of the acrylic acid solution here was 570 g/h and that of the initiator solution 84 g/h. The resulting mixture was subsequently mixed at room temperature with a stream of 43 g/h of an approx. 59% by weight aqueous solution of sodium hypophosphite (regulator) by means of a second micromixer. The resulting reaction mixture was subsequently pumped with a constant flow rate through two series-connected static mixer reactors each with a reaction volume of approx. 10 ml made of stainless steel (1.4571), which had been preheated to the desired experiment temperature. To complete the reaction, the resulting mixture was allowed to react further in a series-connected reaction capillary made of stainless steel (1.4571) with internal diameter 3 mm and length 10 m, which had been preheated to the corresponding experiment temperature. The residence time of the reaction mixture in the reaction zone including the further reaction zone was about 3% min. Three experiments were carried out, with reaction temperatures of 80° C., 100° C. and 120° C. The properties of the resulting polymers are compiled in Table 1.

Polymer 5

Intermediate Initiator Metering Downstream of the First Reaction Zone

Micromixer at ambient temperature mixed. The flow rate of the acrylic acid solution here was 570 g/h and that of the initiator solution 84 g/h. The resulting mixture was subsequently mixed at room temperature with a stream of 43 g/h of an approx. 59% by weight aqueous solution of sodium hypophosphite (regulator) by means of a second micromixer. The resulting reaction mixture was subsequently pumped with a constant flow rate through two series-connected static mixer reactors each with a reaction volume of approx. 10 ml made of stainless steel (1.4571), which had been preheated to the desired experiment temperature. In addition, between the two series-connected static mixer reactors, a 3% by weight aqueous initiator solution (ammonium peroxodisulfate) in a stream of 42 g/h was metered into the reaction mixture. To complete the reaction, the resulting mixture was allowed to react further in a series-connected reaction capillary made of stainless steel (1.4571) with internal diameter 3 mm and length 10 m, which had been preheated to the corresponding experiment temperature. The properties of the resulting polymers are compiled in Table 1.

Polymer 6:

Commercial aqueous polyacrylic acid solution prepared by means of a customary batch process. $M_n$=3950 g/mol, $M_w$=8300 g/mol, $M_w/M_n$=2.1.

Aftertreatment:

Method 1: Chemical Aftertreatment with Hydrogen Peroxide (Comparative)

A 250 ml round-bottom flask was initially charged with 146 g of the aqueous solution of polymer 1 and heated to 90° C. in an oil bath under a nitrogen atmosphere. Thereafter, 15 g of aqueous solution of hydrogen peroxide (50% by weight) were added, and the mixture was stirred at 90° C. for 2 hours and then cooled to room temperature.

The solids content of the polymer solution was then 40.4% by weight; a GPC analysis showed a number-average molecular weight $M_n$ of 3300 g/mol and a weight-average molecular weight $M_w$ of 6500 g/mol ($M_w/M_n$=2.0).

Method 2: Physical Aftertreatment by Steam Stripping

A 500 ml round-bottom flask was initially charged with 100 g of aqueous solution of polymer 1, which were heated to 100° C. in an oil bath. Through a Teflon tube, 600 g of water vapor (100° C.) were passed into the polyacrylic acid solution at atmospheric pressure within one hour, and the vapor which emerged was condensed. Subsequently, the polymer solution was removed and the desired solids content (40%) was established in a rotary evaporator.

Method 3: Physical Aftertreatment by Ultrafiltration

A membrane (Roth-Zellutrans, width 45 mm, length 50 cm, volume 6.42 ml/cm, MWCO: nominal 1000) was softened in demineralized water for 20 min and then rinsed. 100 g of the aqueous solution of polymer 1 were introduced into the tubular membrane which was sealed, and the sealed tube was placed into an elongated bucket with 5 l of demineralized water. After 60 min, this water is replaced by fresh water and left to stand for a further 2.5 h.

Subsequently, the tube contents are removed and concentrated on a rotary evaporator to approx. 40% of the original volume. The sample is placed back into a tubular membrane and the procedure is repeated.

The solids content found after the second ultrafiltration step was 25.3% by weight. The results of the aftertreatment are summarized in Table 1.

Use as Grinding Aids:

To test the polyacrylic acid solutions prepared, a grinding is performed in each case with a Dispermat.

For this purpose, in each case, 300 g of calcium carbonate and 600 g of ceramic beads are mixed and initially charged in a 500 ml jacketed vessel (filled with tap water). Subsequently, 100 g of an aqueous polyacrylic acid solution (3% by weight of polyacrylic acid) are added to the polyacrylic acid to be tested. The grinding is effected by means of a grinding unit of the Dispermat AE-C type (manufacturer: VMA-Getzmann) with a cross-beam stirrer at a rotation speed of 1200 rpm. When 97% of the pigment has a particle size (PS) of less than 1 μm, the grinding is ended (approx. 70 min, instrument for determining the PS by means of laser diffraction: Horiba LA-920). After the grinding, the slurry is filtered through a 780 μm filter with the aid of a porcelain suction filter to remove the ceramic beads, and the solids content of the slurry is adjusted to 77%. The viscosity of the slurry is determined immediately, after 24 h and after 168 h with the aid of a Brookfield DV II viscometer (with spindle No. 3).

In principle, good performance properties in paper coating slips are present for pigment suspensions in which at least 90% of the pigment particles have a particle size of <2 μm and the suspension is still pumpable after a storage time of 24 h.

The results of the dispersion experiments are compiled in Table 2.

Discussion of the Results

The results of the examples and comparative examples show that the combination of a continuous preparation of polyacrylic acid followed by the removal of low molecular weight components leads to a particularly high-quality polyacrylic acid. In experiments regarding the dispersion of calcium carbonate dispersions, the use of this polyacrylic acid leads to $CaCO_3$ dispersions which have a particularly low viscosity.

Even the continuous polymerization alone leads to a dispersion with significantly lower viscosity compared to a polyacrylic acid which is comparable in terms of molar mass but which has been prepared conventionally by means of batch polymerization.

TABLE 1

Compilation of the results of the polymerization experiments

| Example No. | Polymer used | Polymerization temperature | After treatment method | Polymer properties | | | Comment |
| | | | | $M_n$ [g/mol] | $M_w$ [g/mol] | $M_w/M_n$ | |
| --- | --- | --- | --- | --- | --- | --- | --- |
| Comparative example 1 | Polymer 1 | 80° C. | — | 3300 | 6500 | 2.0 | residual monomer content <1000 ppm, strong odor |
| Comparative example 2 | Polymer 1 | 80° C. | Method 1 | | | | no color change in the polymer solution, but significant reduction in odor |
| Example 1 | Polymer 1 | 80° C. | Method 2 | | | | no color change in the polymer solution, but significant reduction in odor |

TABLE 1-continued

Compilation of the results of the polymerization experiments

| Example No. | Polymer used | Polymerization temperature | After treatment method | Polymer properties $M_n$ [g/mol] | $M_w$ [g/mol] | $M_w/M_n$ | Comment |
|---|---|---|---|---|---|---|---|
| Example 2 | Polymer 1 | 80° C. | Method 3 | | | | no color change in the polymer solution, but significant reduction in odor |
| Example 3 | Polymer 2 | 80° C. | — | 4700 | 14 900 | 3.2 | residual monomer content 2700 ppm |
| Example 4 | Polymer 3 | 100° C. | — | 3300 | 10 200 | 3.1 | residual monomer content <20 ppm |
| Example 5 | Polymer 4 | 120° C. | — | 2900 | 8200 | 2.9 | residual monomer content 2600 ppm |
| Example 6 | Polymer 5 | 120° C. | — | — | — | — | residual monomer content <20 ppm |
| Comparative example 3 | Polymer 6 | | — | 3950 | 8300 | 2.1 | conventional preparation in a batch process strong odor |
| Comparative example 4 | Polymer 6 | | Method 1 | | | | significant reduction in odor |

TABLE 2

Results of calcium carbonate dispersion

| Example No. | Polymer used | After treatment method | Solids content of slurry [%] | Proportion of particle size [%] <1 μm | <2 μm | Viscosity [mPas] Immediately | After 1 h | After 24 h | After 168 h |
|---|---|---|---|---|---|---|---|---|---|
| Comparative example 1 | Polymer 1 | — | 77 | 98.2 | 100 | 201 | 289 | 373 | 722 |
| Comparative example 2 | Polymer 1 | Method 1 oxidation with $H_2O_2$ | 77 | 97.5 | 99.6 | 209 | 376 | 667 | 1386 |
| Example 1 | Polymer 1 | Method 2 steam stripping | 77 | 97.5 | 100 | 192 | 301 | 392 | 527 |
| Example 2 | Polymer 1 | Method 3 ultrafiltration | 77 | 97.2 | 100 | 278 | 383 | 444 | 528 |
| Comparative example 3 | Polymer 6 | — | 77 | 98 | 100 | n.d. | n.d. | n.d. | 2981 |
| Comparative example 4 | Polymer 6 | Method 1 oxidation with $H_2O_2$ | 77 | 98 | 100 | 157 | 392 | 2296 | >5000 |

(n.d. not determined)

The invention claimed is:

1. A process for preparing aqueous solutions of homo- or copolymers of acrylic acid by means of free-radical polymerization of acrylic acid and optionally water-soluble, monoethylenically unsaturated comonomers in an aqueous medium in the presence of at least one water-soluble initiator and of at least one water-soluble regulator, where the amount of acrylic acid is at least 50% by weight based on the sum of all monomers together and the number-average molar mass $M_n$ of the homo- or copolymer is 1000 g/mol to 20 000 g/mol, which comprises conducting the polymerization by means of a continuous process which comprises at least the following steps:

(Ia) continuously metering the reactants and water into a mixing unit comprising at least one mixer with microstructures, where the characteristic dimension of the mixer (the smallest extent at right angles to the flow direction) is in the range from 1 μm to 10,000 μm and mixing the reactants in the mixing unit at a temperature $T_M$, and (Ib) conducting continuous free-radical polymerization by passing the resulting aqueous reaction mixture through at least one reaction zone with microstructures, where the characteristic dimension of the reaction zone (the smallest extent at right angles to the flow direction) is 0.1 mm to 30 mm whose temperature is controlled by a temperature control medium of temperature $T_{target}$ in the range from 10° C. to 200° C., the reaction mixture being heated in a first—viewed in flow direction—region of the reaction zone, and, after passage through the heating zone, the temperature difference ΔT between the temperature $T_{target}$ and the actual temperature $T_R$ at any point in the reaction zone downstream of said heating zone, $|T_R-T_{target}|$, being ≤50 K, with the proviso that $T_{target}$ is greater than the mixing temperature $T_M$, and wherein, after the polymerization, in a further process step (II), low molecular weight components with a molar mass $M_n$≤1000 g/mol are at least partly removed from the resulting aqueous polymer solution by means of physical or physicochemical separating methods selected from the group of distillative removal, removal by extracting using steam, inert gases or solvents, absorption methods, chromatographic methods or osmotic methods.

2. The process according to claim 1, wherein step (Ia) at least one solution of acrylic acid in water, a solution of at least one initiator in water and at least one regulator are mixed with one another.

3. The process according to claim 1, wherein $T_{target}$ is at least 10 K greater than $T_M$.

4. The process according to claim 1, wherein $T_M$ is 10° C. to 30° C.

5. The process according to claim 1, wherein the temperature difference $\Delta T=|T_R-T_{target}|$ is $\leq 20$ K.

6. The process according to claim 1, wherein $T_{target}$ is 50° C. to 200° C.

7. The process according to claim 1, wherein the residence time $t_R$ within the reaction zone in step (Ib) is 5 s to 30 min.

8. The process according to claim 1, wherein the product of heat transfer coefficient and volume-specific heat transfer area in the at least one reaction zone is greater than 12 500 W/m³K.

9. The process according to claim 1, wherein the polydispersity of the homo- or copolymer of acrylic acid, $M_w/M_n$, is $\leq 2.5$.

10. The process according to claim 1, wherein the amount of acrylic acid is at least 95% by weight based on the sum of all monomers together.

11. The process according to claim 1, wherein the removal of volatile components is conducted by means of ultrafiltration using a membrane which can remove substances with a $M_n$ of $\leq 1000$ g/mol.

12. The process according to claim 11, wherein the ultrafiltration is conducted at a pressure of 0.1 to 50 bar.

13. The process according to claim 1, wherein the removal of volatile components is conducted by means of stripping with steam.

14. The process according to claim 13, in which steam is passed through the boiling aqueous polymer solution.

15. The process according to claim 13, wherein the amount of steam passed through is 50 to 1000% by weight based on the amount of the aqueous polymer solution.

* * * * *